SAMUEL ENDSLOW.

Improvement in Insect Traps.

No. 119,337.   Patented Sep. 26, 1871.

Witnesses:
Fred. Artos
R. H. Young

Inventor
Samuel Endslow,
By his Attorney,
T. N. Uppherman

UNITED STATES PATENT OFFICE.

SAMUEL ENDSLOW, OF BLAIN, PENNSYLVANIA.

IMPROVEMENT IN INSECT-TRAPS.

Specification forming part of Letters Patent No. 119,337, dated September 26, 1871.

*To all whom it may concern:*

Be it known that I, SAMUEL ENDSLOW, of Blain, in the county of Perry and State of Pennsylvania, have invented certain new and useful Improvements in Traps for the Capture and Destruction of Insects, &c.; and I do hereby declare that the following is a full, clear, and exact description of the construction and operation of the same, reference being had to the accompanying drawing, in which—

Figure 1:
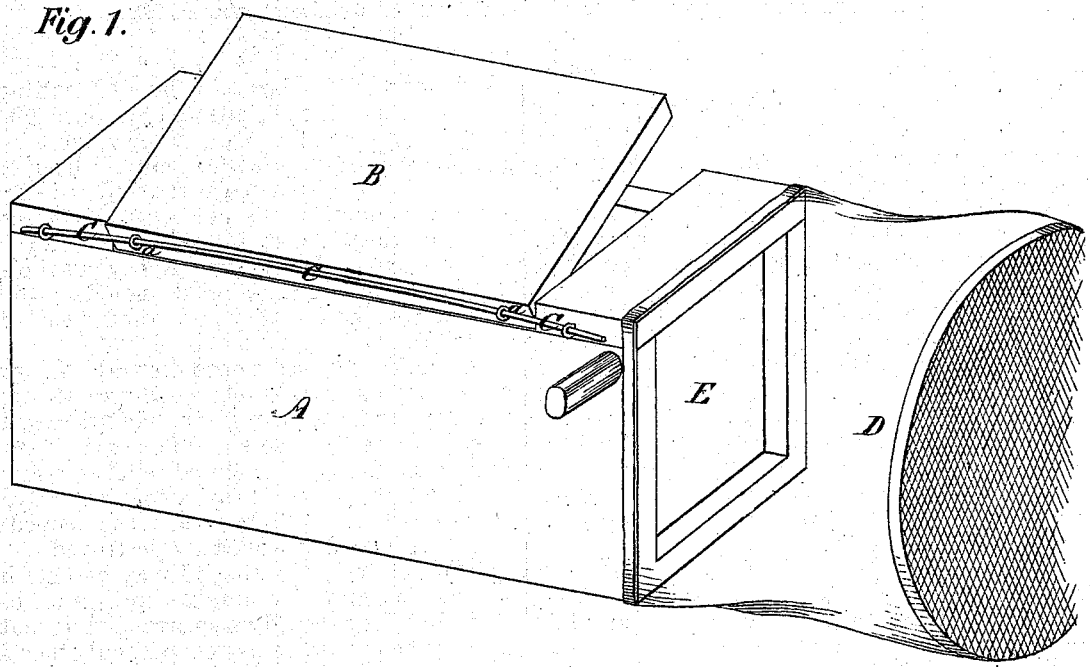
Figure 2:
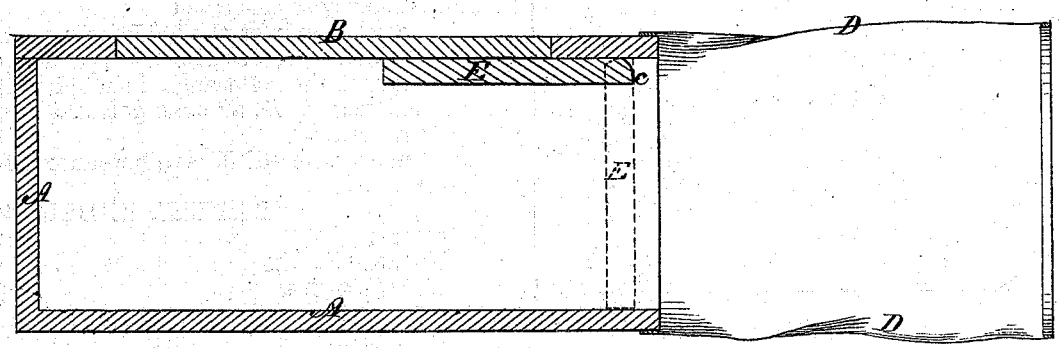

Figure 1 represents a view, in perspective, taken from the rear side of the box, showing the lid held in its open position by the curved spring which forms its hinge. Fig. 2 represents a longitudinal vertical section, showing (by dotted lines) the egress-valve in position to retain the insects within the box and (by full lines) the said valve raised to allow them to escape into the hooped netting, where they are destroyed.

My invention relates to means for capturing and destroying insects; and it consists in so hinging the lid of the box upon its spring that the latter serves to retain it in a partly raised position to allow of the ingress of the insects within the box, while it may be readily closed by pressure of the hand to confine them therein, as will be described. My invention also consists in constructing that portion of the box communicating with the hooped netting of a pivoted end, capable of being turned inward to allow the insects to escape into said hooped netting, but prevented from going beyond the sides of the box by a safety-shoulder on its upper side, as will be further described.

In the accompanying drawing, A represents an ordinary wooden box, of any suitable form, provided with a lid, B, which is kept in a partly raised position by the curved spring C, which serves also as its hinge, on which the eyes *a* of the lid turn. Attached in any suitable manner to one end of the box is a hooped netting, D, and communication is effected between this netting and the box by means of the valve E, which is pivoted at its top to the front and back of the box. It is so constructed as that it may be turned inward to admit of the escape of the insects into the netting when it is desired to destroy them, but is prevented from turning beyond the sides of the box by a right-angled shoulder, *c*, at its upper side abutting against the under side of the top of the box.

When it is desired to use the trap its inside is coated with any substance which will attract the insects to which, through the always-raised lid, they have ready access. When desired to confine them the lid B is closed by the pressure of the hand, the valve E is turned inwardly, and they escape to the light within the hooped netting D, where they are easily destroyed.

If found desirable, the lid may be held in its elevated position by suitable springs on either side; but they should be so arranged as that the lid may be carried to its seat without other force or means than the simple pressure of the hand.

Having described my invention, I claim—

1. The lid B, of an insect-trap, held in a raised position by the curved spring C, which forms at the same time its hinge, operated in the manner and for the purpose described.

2. The combination of the lid B, held open by its spring-hinge C, as described, the pivoted end E provided with the right-angled shoulder *c*, and the hooped netting D, all arranged and operating as described.

In testimony whereof I have hereunto signed my name.

SAMUEL ENDSLOW.

Witnesses:
FRENCH F. MIX,
H. H. YOUNG.

(51)